Figure 1:
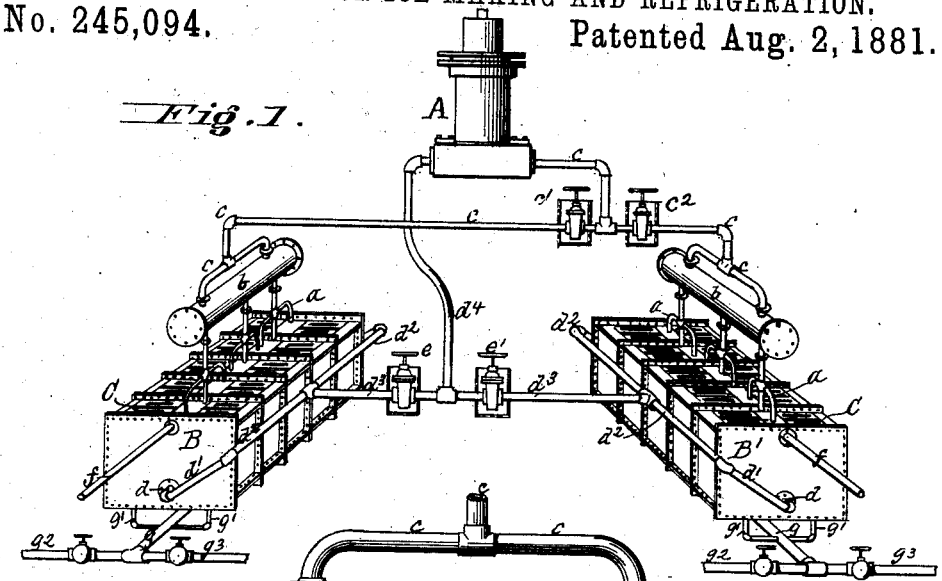

(No Model.)

T. ROSE.
METHOD OF WORKING HYDRATED VOLATILE REFRIGERATING AGENTS, AND APPARATUS FOR ICE MAKING AND REFRIGERATION.

No. 245,094. Patented Aug. 2, 1881.

Attest
H. R. Perrine
Philip F. Larnet

Inventor.
Thomas Rose.
By Wm. C. Wood Atty.

UNITED STATES PATENT OFFICE.

THOMAS ROSE, OF SAN ANTONIO, TEXAS, ASSIGNOR TO ROYAL CHAPIN, OF SAME PLACE.

METHOD OF WORKING HYDRATED VOLATILE REFRIGERATING AGENTS, AND APPARATUS FOR ICE-MAKING AND REFRIGERATION.

SPECIFICATION forming part of Letters Patent No. 245,094, dated August 2, 1881.

Application filed July 6, 1881. (No model.)

*To all whom it may concern:*

Be it known that I, THOMAS ROSE, of San Antonio, in the county of Bexar and State of Texas, have invented a certain new and useful Method of Working Hydrated Volatile Refrigerating Agents and Improvements in Apparatus for Ice-Making and Refrigeration; and I do hereby declare that the following specification, taken in connection with the drawings furnished and forming a part of the same, is a clear, true, and complete description of my invention.

My said improvements involve the use of such highly volatile matters as are capable of hydration—as, for instance, ammonia, that being the refrigerating agent preferable to all others of which I am cognizant.

The object of my invention is a simplification in the mode of operation, and in apparatus which enables the employment of comparatively unskilled labor, the production of apparatus at comparatively low cost, and the working of the ammonia-gas at comparatively low pressure, thus obviating the dangers attendant upon and the wasteful loss of ammonia by leaks incident to working ammonia at the usual high pressure. In other words, instead of confining my attention to the extensive production of ice for mercantile purposes, involving an expensive plant of complicated machinery, I have sought to meet the demand for simple and cheap apparatus, adapted to the use of ranchmen, planters, and seaside and pleasure resorts in those regions where a supply of natural ice is not available.

Hydrated ammonia has heretofore been employed in connection with furnace retorts or boilers, cumbersome and costly condensing apparatus, pumps, and refrigerating-chambers. Under my novel method or mode of operation I rely upon the mechanical transfer of the ammoniacal gas from a body or volume of hydrate of ammonia in fully saturated solution to a smaller body or volume of hydrate of half the strength of the first, thus enriching the latter at the expense of the former. The withdrawal of the ammonia from the first solution results in refrigeration adjacent thereto, and the heat developed adjacent to the second solution is duly disposed of by flowing water at available temperatures. The transfer of gas having been thus effected a reverse transfer is made, and refrigeration occurs adjacent to the second solution, the first being recharged by the return of the gas, and so on indefinitely. These solutions are contained in separate chambers, and each chamber, therefore, alternately serves as a refrigerator and a condenser, and each is supplied with water-tanks, which alternately serve as ice-molds, and as conduits for water essential to convey away the heat incident to the freezing operation, the condensation of the gases, and the recharging of the solution last reduced. The chambers containing these solutions are connected by suitable pipes with a pump for mechanically effecting the transfer of the gas. The several features of my invention are made the subjects of separate claims at the close of this specification.

To more particularly describe my invention I will refer to the accompanying drawings, in which—

Figure 2:
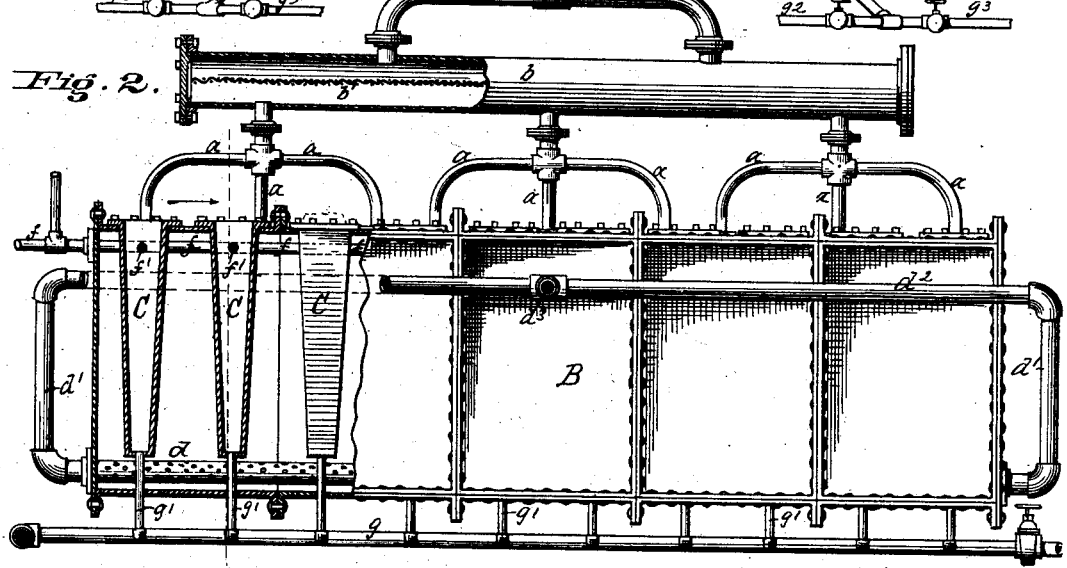
Figure 3:
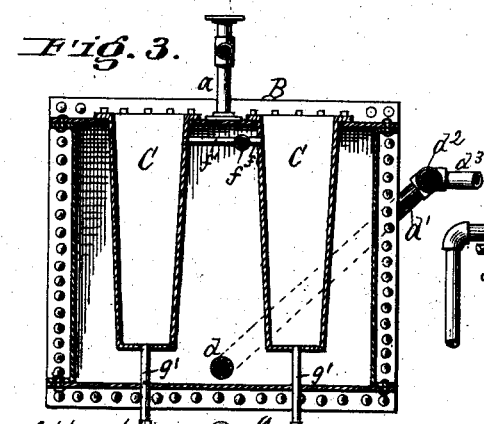
Figure 4:
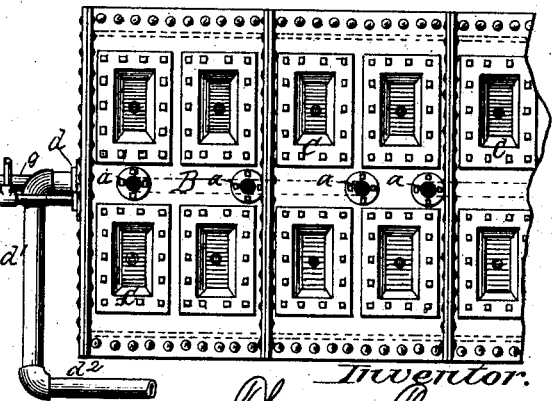

Figure 1 represents, in perspective, so much of an apparatus as is deemed requisite to illustrate my invention. Fig. 2 represents one of my complex refrigerating and condensing chambers, partially in longitudinal vertical section. Fig. 3 represents the same in lateral vertical section. Fig. 4 represents a portion of the same in top view.

The pump A need not be particularly described, as some one of the many well-known types of pump employed in ice-machinery may be relied upon for the required service. I have shown a piston-pump, but I prefer to use the Sudlow rotary pump.

The chambers B and B' are the receptacles for the hydrate. Their construction may be largely varied, but I prefer that they be rectangular in form and composed of suitable rolled-iron plates carefully bolt-jointed, and however constructed these chambers should be thoroughly gas-tight. Well-known details of construction with reference to packing of joints, &c., should be duly considered in the building of these chambers. Their dimensions will, of course, be varied to meet specific requirements; but as each pair of chambers are coupled together to co-operate alternately as refrigerator and condenser they should be of equal internal capacity. The pump is in double communication with both chambers. Branched pipes $a$ enter at more or less frequent intervals through the top of each chamber, according to its length, terminating above in larger horizontal pipes or chambers $b$, which are internally divided longitudinally by horizontal perforated diaphragms $b'$, which may be of fine wire-gauze, to serve as stops against the upward passage of watery vapor with the ammonia-gas. The chambers $b$ are connected with the inlet-port of the pump A by way of the pipes $c$, which are provided at $c'$ and at $c^2$ with a cock, by means of which exhaust communication may be cut off between either chamber and the pump. These cocks, as well as all others which control the ammonia-pipes, should be well inclosed in water-boxes or other equivalent contrivances for preventing the induction of air and the escape of ammonia.

Extending inside, along near the bottom from end to end of each chamber B and B' is a perforated pipe, $d$, which at each end is connected by pipes $d'$ and $d^2$ with pipe $d^3$, which communicates, via pipe $d^4$, with the outlet-port of pump A. Each pipe $d^3$ is provided with an inclosed cock, $e$ and $e'$, whereby induction communication may be cut off, via either of said pipes, between said pump and the perforated pipe $d$ within the chamber.

It is desirable that the gas forced into the chambers via pipe $d$ should be as widely distributed as possible, and I therefore branch the pipe $d^2$ between it and the perforated pipe $d$, so that the gas will enter at each end of the latter.

With the system of pipes thus far described it is obvious that the ammonia-gas can be readily exhausted from either chamber and forced into the other, it being understood that when chamber B is operating as a refrigerator and chamber B' as a condenser cocks $c'$ and $e'$ are open and cocks $c^2$ and $e$ closed, and that when the chamber B' is operating as a refrigerator and chamber B as a condenser cocks $c^2$ and $e$ are open and cocks $c'$ and $e'$ are closed, the pump being operated in the same manner in either case.

I will next describe the water-tanks, which alternately operate as ice-molds and as conduits for cooling water during the condensing operation. In each instance C denotes a water-tank, which may be composed of rolled sheet-iron (essentially put together with gas-tight joints) rectangular in form, slightly larger at the top than at the bottom, and immovably set into and through the tops of the chambers B B', with a gas-tight joint at all points. The number of these tanks and their dimensions will be varied according to the size of the chambers, but their lower ends should extend nearly to the bottom of their chamber. As the matter of thickness of the ice is of comparatively little consequence in view of its immediate consumption, I prefer that these tanks be not more than from three to six inches across, their width from twelve to eighteen inches, and their depth from say, twenty-four to thirty-six inches, so that the sides of said tank-molds will afford an extensive radiating surface when operating as conduits during the condensing operation. As a rule, I prefer that the interior cubic aggregate capacity of the ice-molds in any one chamber should be about one-sixth of the interior capacity of the chamber. Each tank-mold should be provided with a close-fitting cover composed of wood or other good non-heat-conducting material.

Extending centrally along near the top of each chamber B and B', from end to end, is a water-pipe, $f$, which communicates by short pipes $f'$ with each tank-mold C at a point slightly below its upper end. Each tank-mold C, at its bottom, also communicates with another water-pipe, $g$, via short pipes $g'$.

Suitable pumping apparatus may be connected with the pipe $g$, or it may be connected with pipes communicating with a source of supply under hydrostatic pressure. The pipe $g$ is provided at one end with a branch pipe, $g^2$ $g^3$, so that two grades of water may be supplied to the tank-molds, if good water be not abundant—i. e., when the molds are to be filled for congelation the water may be inducted via pipe $g^2$, the cock in pipe $g^3$ being meantime closed; and when said tanks are operating as aids to condensation pipe $g^2$ will be closed and water of a poorer quality inducted via pipe $g^3$.

With the apparatus thus described I operate as follows: I nearly fill the chamber B with a saturated solution of hydrate of ammonia and charge the chamber B' with about three-quarters as much in volume as in chamber B of a solution of half strength—say, .940 specific gravity. Then fill the tank-molds C in chamber B with water suitable for ice and cause water to pass into and upward through the tank-molds C in chamber B' and flow therefrom via pipe $f$. The cocks $c'$ and $e'$ being open (and cocks $c^2$ and $e$ closed) the pump is then operated, which exhausts the ammonia-gas from chamber B and forces it into chamber B', causing it to ascend through the low-charged solution therein contained. The heat withdrawn from the water which is formed into ice in the molds in chamber B is eliminated from the gas, when the latter is forced into chamber B' by the water, which freely flows upward and through the several tanks C therein. The low-strength solution in chamber B' becomes fully charged with ammonia and increases in volume until the solution in chamber B is proportionally weakened and reduced in volume.

Each chamber is provided with a mercury-gage, and when either chamber is operating as a condenser the gage registering about 28° indicates that the freezing operation in the other chamber is completed and that the condenser solution has become a fully-saturated solution of the hydrate of ammonia.

The operation thus described having been completed, the molds C in chamber B' are filled with water for freezing, the cocks which were before open are closed, and those which were closed are opened, whereupon gas from the condenser is returned *via* the pump to the chamber B until its temperature is so far raised as to loosen the ice in its molds, so as to permit the removal of the ice-cakes by any of the well-known means heretofore employed. Thereafter water is freely passed through those molds for aiding in condensation, as before described, and so on, each chamber alternately operating as a refrigerator and a condenser.

The operation of the apparatus shown and described involves what I understand to be a novel method of working hydrated volatile refrigerating agents in the art of artificial refrigeration—to wit, the transfer of volatile matter from a volume or body of hydrate of great strength to a volume or body of hydrate of lesser strength, until their relative conditions are reversed, and then reversing that transfer so that each body or volume of solution can alternately serve or operate as an aid to refrigeration and as an aid to the condensation of the gas expanded during the refrigerating operation.

The affinity of water for ammonia is so great that the weak solutions in the chambers have a tendency to back up toward the pump; but this should be guarded against by locating the pump well above the chambers B B' or elevating the pipes $d^2$ $d^3$ between said chambers and the pump. If the pump be operated at too great a speed it would be liable to raise more or less of the liquid solution with the gas, and to guard against that I provide the perforated diaphragms $b'$ in the pipe-chambers $b$, and also branch the pipes $c$, which connect said pipe-chambers with the pump, and still further branch the pipes $a$ between the pipe-chambers $b$ and the large chambers B and B'.

The non-employment of non-congealable liquids adjacent to and surrounding the ice-molds as commonly heretofore practiced enables prompt refrigeration, and also admits of the use of said molds as conduits for the condensing water. Their walls being thin the heat is freely conducted through them in either direction, according to the service which they may for the time being be performing. Apparatus involving the same principle may be obviously modified in construction for cooling liquids to be employed in ordinary preservative refrigeration—as, for instance, instead of the ice-molds extensive coils of pipe may be placed in both chambers and so connected that each may be alternately used as a conduit for liquid to be cooled, while the other coil is empty. Correspondingly extensive coils also in each chamber would permit an extensive supply of water for cooling during the condensing operation in one chamber, the cooling-coil in the other chamber being meantime emptied. The same alternate operation would be involved, and such an apparatus would therefore involve in its mode of operation the main feature of my invention.

Instead of having separate coils one coil in each chamber could be relied upon, if it be provided with branch connections, through which the liquid to be cooled could be entered to and through the coil to its destination, and thereafter the cooling-water entered to the same coil. Such an arrangement would merely involve an obviously simple arrangement of pipes and cocks within the comprehension of any person skilled in the art of piping.

The details of construction, as illustrated, should, of course, be varied according to circumstances, and with due reference to convenience, economy in labor, and materials.

Having thus described my invention, I claim as new and desire to secure by Letters Patent—

1. The improvement in working hydrated volatile refrigerating agents for ice-making and refrigeration which consists in the employment of two separate volumes or bodies of hydrate of unequal strength, and the transfer of volatile matter from the stronger solution to the weaker, and reversing said transfer, and so on, for enabling each volume to alternately operate as an aid to refrigeration and to condensation, substantially as hereinbefore described.

2. The combination of two or more chambers alternately operating as refrigerators and condensers, water-tanks in said chambers, which alternately serve as ice-molds and conduits for waters employed for condensation, a circulating pump or pumps, and suitable connecting-pipes, whereby the volatile portion of the hydrate may be transferred from either of said chambers to another, and enable said chambers to be operated alternately as ice-making refrigerators and condensers, substantially as described.

THOMAS ROSE.

Witnesses:
P. H. WARD,
JAMES DURYEE STEVENSON.